UNITED STATES PATENT OFFICE.

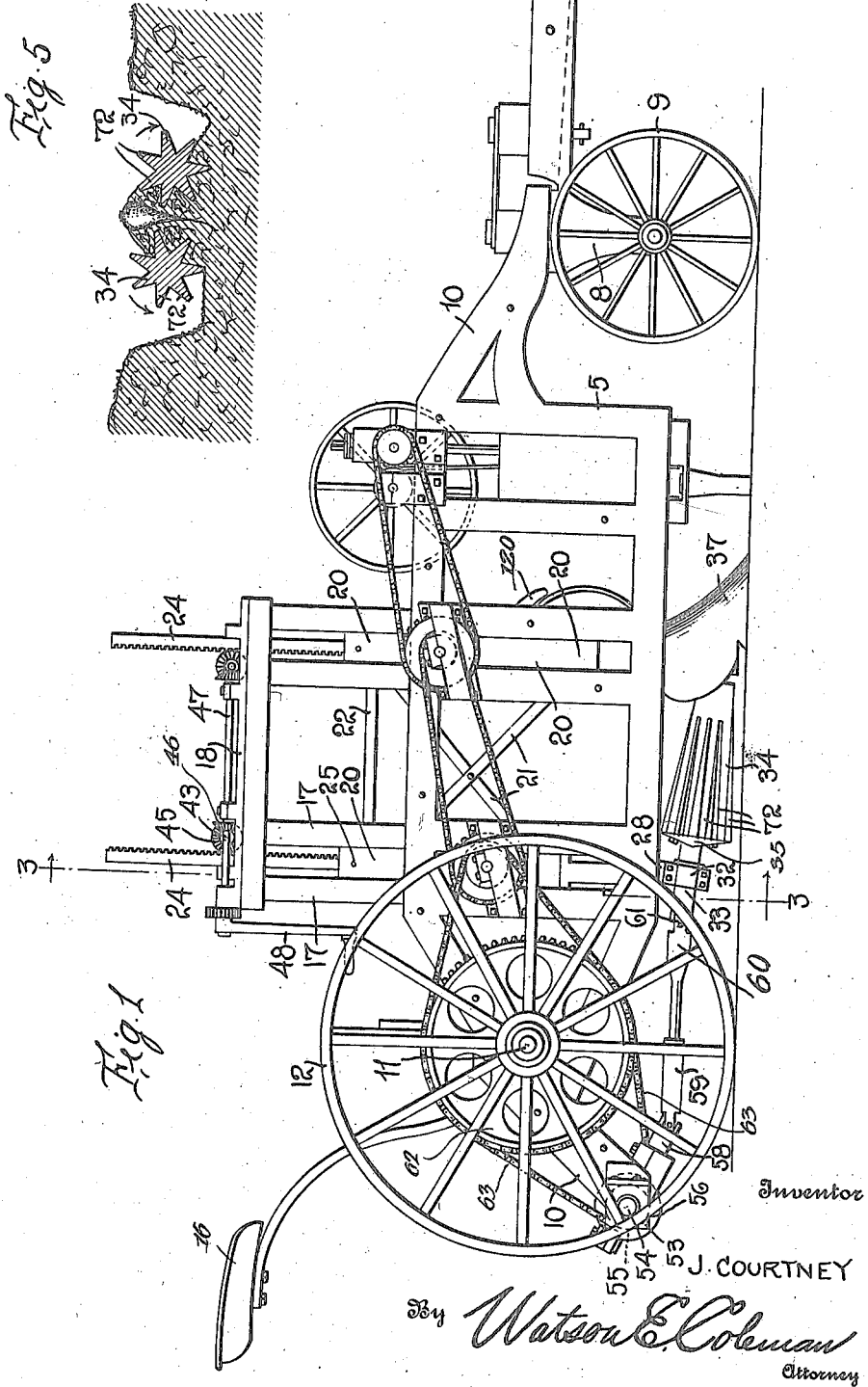

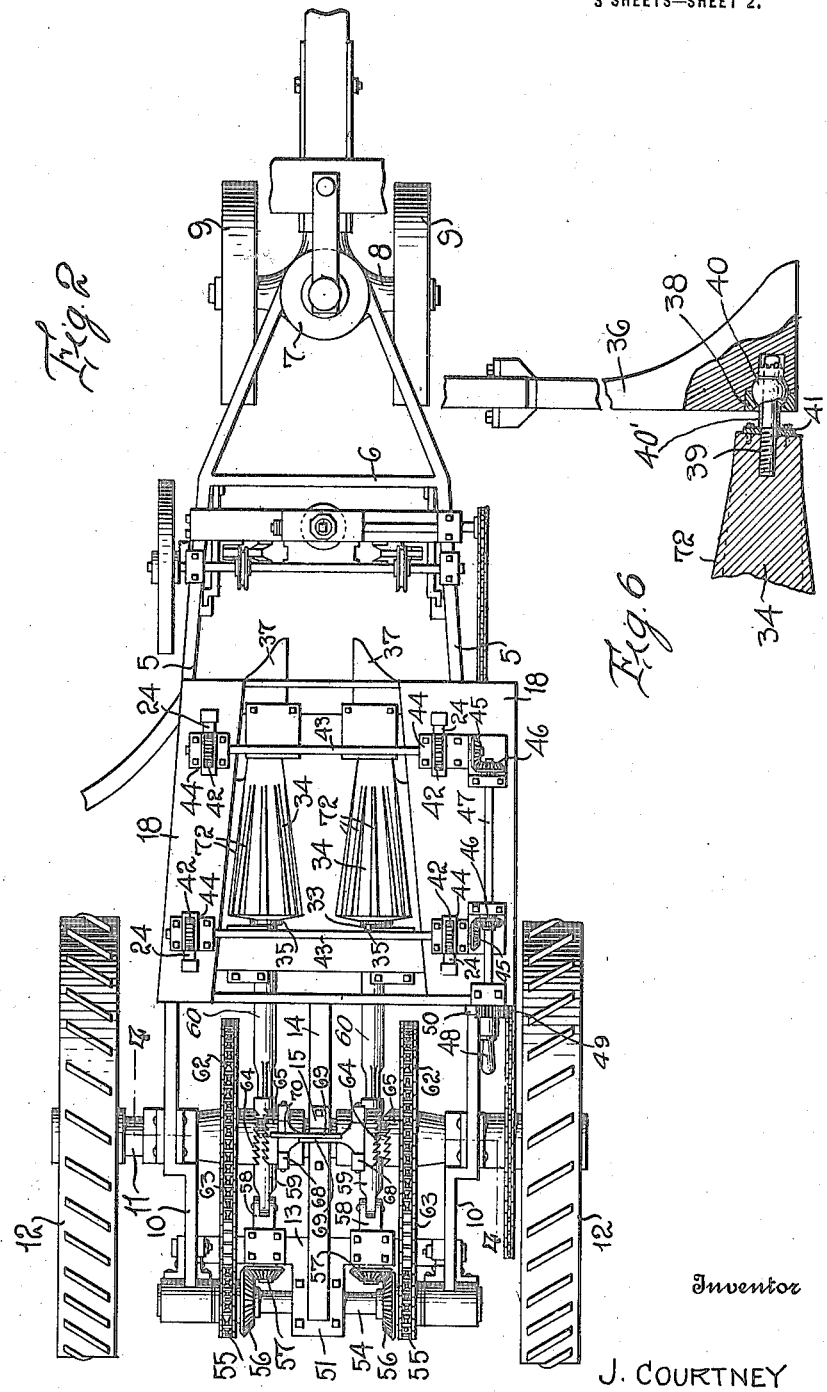

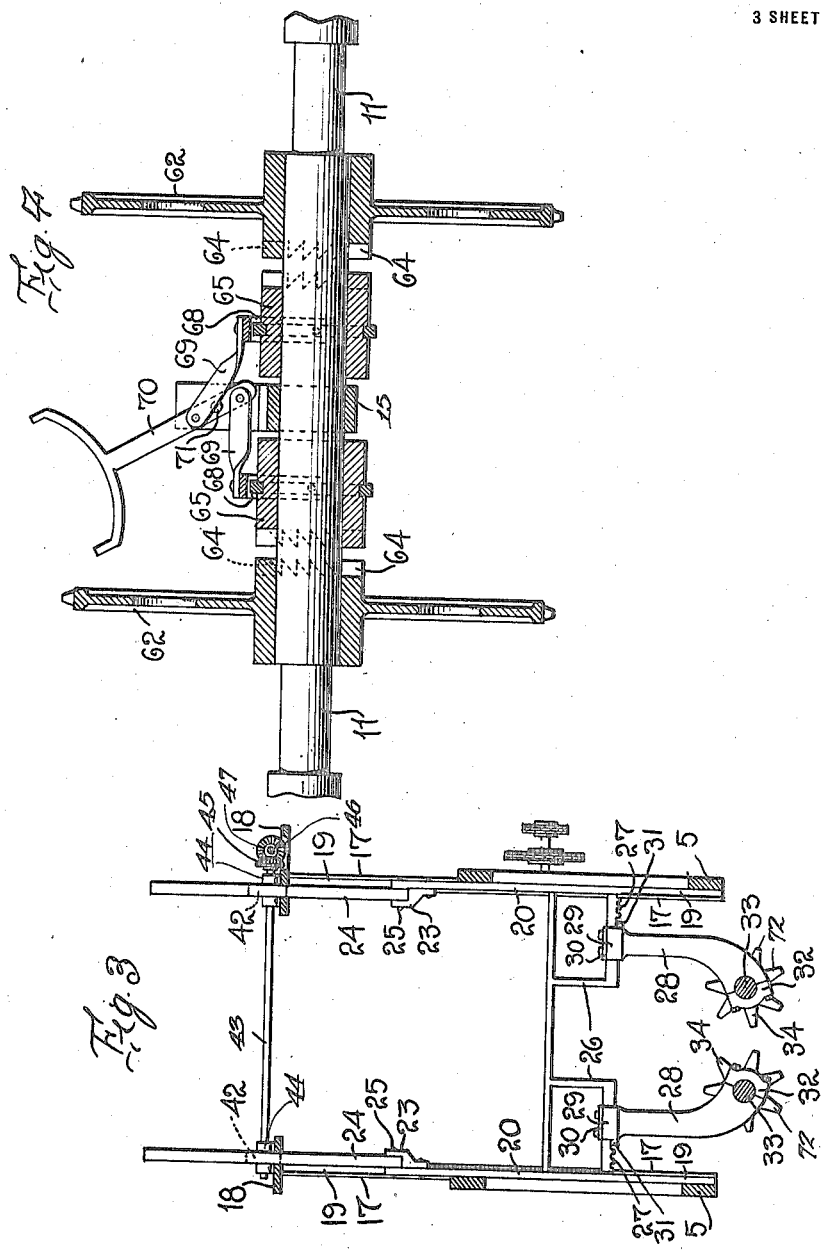

JOHN COURTNEY, OF ALBANY, OREGON.

BEET-HARVESTING MACHINE.

1,269,789.　　　　　Specification of Letters Patent.　　Patented June 18, 1918.

Application filed May 27, 1916. Serial No. 100,297.

*To all whom it may concern:*

Be it known that I, JOHN COURTNEY, a citizen of the United States, residing at Albany, in the county of Linn and State of Oregon, have invented certain new and useful Improvements in Beet-Harvesting Machines, of which the following is a specification, reference being had to the accompanying drawings.

This invention relates to an improved beet harvesting machine and has for its primary object to provide comparatively simple and novel mechanism for harvesting beets and like agricultural products of subterranean growth without in any way injuring the same.

It is one of the specific objects of the invention to provide means whereby a cushion of earth is formed upon opposite sides of the vegetable, and ribbed or fluted pulling cones or rollers co-acting with the earth cushion on opposite sides of the vegetable to loosen and lift the same.

It is also one of the important provisions of my invention to devise very simple mechanism whereby the pulling rollers or cones may be vertically adjusted and disposed at any desired longitudinal inclination.

With the above and other objects in view, my invention consists in the novel features of construction, combination and arrangement of parts to be hereinafter more fully described, claimed and illustrated in the accompanying drawings, in which:

Figure 1 is a side elevation of a beet harvesting machine constructed in accordance with the preferred embodiment of my invention;

Fig. 2 is a top plan view thereof;

Fig. 3 is a transverse section taken on the line 3—3 of Fig. 1;

Fig. 4 is a transverse section taken on the line 4—4 of Fig. 2;

Fig. 5 is a transverse section illustrating the operation of the harvesting rollers; and Fig. 6 is a detail vertical section of the forward end of one of the harvesting rollers.

Referring in detail to the drawings, 5 designates the two longitudinal side frames which are integrally connected adjacent their forward ends by the transverse bar 6. The forward end portions of the sides 5 of the frame structure extend in convergent relation and are integrally connected by a head plate 7 which is mounted in any approved manner upon the vertically disposed, U-shaped axle casting 8, the opposite ends of which are formed with axle studs on which wheels 9 are revolubly mounted. The sides 5 of the machine frame are of the skeletonized construction indicated in Fig. 1 of the drawings, for the sake of lightness, and at their rear ends each of these side frames 5 is formed with an obliquely disposed, downwardly projecting portion 10. It will be manifest however, from the following description, that the vital and essential characteristics of the invention are in nowise limited to the particular frame construction described and illustrated but may be readily adapted to various other frame supports.

In suitable bearings on the sides 5 of the frame, at the upper ends of their obliquely inclined portions 10, the main wheel supporting axle 11 is journaled, and upon the ends of the axle, exteriorly of the frame, the ground wheels 12 are securely keyed or fixed in any other preferred manner. The extremities of the downwardly projecting portions 10 of the frame are connected by a transverse bar 13 which is fixed to the angularly bent, longitudinal frame bar 14. A bearing 15 for the central portion of the wheel axle 11 is fixed upon this longitudinal bar 14, and a suitable seat 16 is also mounted upon the bar 14.

Upon the intermediate portion of each of the side frames 5, spaced pairs of uprights 17 are rigidly secured at their lower ends, and the pairs of uprights at opposite sides of the machine are rigidly connected at their upper ends by means of plates indicated at 18. The uprights in each pair have their inner opposed faces channeled, as at 19. Bars 20 are vertically movable in the channels of each pair of uprights 17 and the bars on the same side of the machine are connected and braced by means of the intersecting bars 21 and a horizontal bar 22 which connects the upper ends of the bars 20. Upon the inner face of each of the bars 20, at its upper end, a bracket 23 is secured, and the lower end of a rack bar 24 is fixed between this bracket and the bar 20 by means of a bolt 25. The lower ends of the bars 20 are connected by integrally spaced rectangular frames 26 which extend transversely of the machine. The lower bar of each of the frames is provided with a longitudinal series of rack teeth 27. 28 designates a hanger arm having a boxing 29 formed on its upper end slidably engaged with the toothed frame bar. A cap plate 30 is adapted to be bolted upon the slidable boxing, and this boxing is provided upon one of its ends with an upwardly projecting lug 31 for engagement between the teeth 27 on the frame bar, whereby the hanger arm is securely held in its adjusted position against transverse shifting movement with respect to the frame. The lower end of each hanger 28 is inwardly curved and provided with a bearing 32 to receive the shaft 33 of one of the longitudinally extending conical pulling rollers 34. One end of the shaft is threaded for the connection of the roller thereto, and at the inner end of the threaded portion a flange or collar 35 is formed upon the shaft, to which the larger end of the roller 34 is adapted to be securely bolted. The other pair of vertically movable bars 20 at the forward end of the machine, are connected by the spaced frames 26 similar to those above referred to, and hangers 36 are also adjustably mounted in these latter frames. The lower ends of these hangers are enlarged and properly formed for the attachment of the plows 37 thereto. The rear side of each hanger 36 is recessed to receive a bearing casting 38, and this casting and the hanger are formed with a portion of a socket to receive the spherical enlargement 40 on a sleeve 40', said sleeve having a collar 41 securely bolted to the end of the roller. A stud shaft 39 threaded in the roller extends through said sleeve and the enlargement 40. Thus, the forward ends of the rollers are mounted to oscillate with respect to the hangers 36.

The vertical rack bars 24 extend upwardly through openings in the plates 18, and said rack bars have meshing engagement with pinions 42 on the opposite ends of the transverse shafts 43 which are mounted in suitable bearings 44 fixed to the plates 18. Upon one end of each shaft 43, a bevel pinion 45 is secured, which meshes with a similar pinion 46 on a longitudinal shaft 47. To one end of this shaft a suitable hand crank 48 is connected, and a ratchet 49 is fixed upon the shaft for engagement by a spring pawl 50 whereby the shaft is held against turning movement in one direction. It will be readily seen from this mounting and arrangement of the conical rollers 34, that by rotating the shaft 41, these rollers, as well as the plows 37, may be raised or lowered and properly positioned with respect to the ground.

The transverse bar 13 is centrally formed with a rearwardly projecting, U-shaped portion 51 having a bearing fixed to its under side. In this bearing and in bearings 53 on the lower ends of the inclined portions 10 of the frame sides 5, a transverse shaft 54 is rotatably mounted. A sprocket pinion 55 is keyed upon the shaft at each side of the central bearing, said pinion being formed upon its inner face with a bevel gear 56. Each of these gears meshes with a bevel pinion 57 fixed to the rear end of a short shaft 58 journaled in a bearing on the bar 13. To the forward end of the shaft 58, one end of a sleeve 59 is connected by a universal joint. The shaft section 60 is keyed in the sleeve 59 for sliding movement with respect thereto, and the forward end of this shaft section is connected by means of a universal joint 61 to the rear end of the shaft 33. Upon the main supporting axle 11, the spaced sprocket wheels 62 are loosely mounted and each of these sprocket wheels is connected by a driving chain 63 to one of the sprocket pinions 55. Each sprocket wheel 62 is provided upon its inner face with clutch teeth 64, and upon the axle 11 the sliding clutch members 65 are keyed. A yoke 68 is operatively engaged with each of these clutch members and these yokes are connected by means of links 69 to a foot operated lever 70 on opposite sides of its pivot indicated at 71. This lever is suitably mounted upon the central axle bearing 15. It will be readily seen that by simply shifting the lever 70 in the proper direction, the clutch members may be operatively engaged with the clutch teeth 64 on the sprocket wheel 62 so that rotation will be transmitted to the shaft 54. Through the medium of the gearing and the flexible shaft connections, the two conical rollers 34 will be simultaneously rotated in relatively opposite directions. The rollers 34 are preferably fluted or corrugated to provide a series of spaced longitudinally extending ribs 72 thereon. These ribs merge into the periphery of the cone rearwardly of the forward end portion thereof so that these forward end portions of the cones have smooth, uninterrupted peripheral surfaces.

The improved beet pulling means above described may be used in connection with any desired beet topping or capping mechanism arranged in advance of the plows 37.

If desirable, an extra seat, indicated at 120, may be provided on one side of the machine frame substantially in line with the plows 37 so that an attendant may remove any trash or any other accumulations which might enter between the plows and interfere with the proper operation of the pulling rollers 34.

From the foregoing description, taken in connection with the accompanying drawings, the construction and manner of operation of my improved beet harvester will be clearly understood. The machine travels between the beet rows, the beet stalks being in line with the transverse center of the machine so that the revolving cones 34 will move upon opposite sides thereof. The plows 37 have been properly adjusted so that their points will penetrate the ground to the desired depth at each side of the beet row and a furrow is formed upon each side of the row, and in these furrows the forward ends of the revolving cones 34 are disposed. It will be observed that by cutting away soil in this manner on each side of the plant row, a cushion of soil remains and surrounds the beets. In the progress of the machine, as the gradually enlarging rear portions of the cones 34 approach the opposite sides of the soil cushion just referred to, the ribs 72 on said cones which, as heretofore stated, are constantly revolved in relatively opposite directions, will exert an upward compressing action upon the soil cushion and thus urge the beets upwardly, loosening or uprooting the same. The soil cushion surrounding the beets obviates all possibility of injury to the beets by abrasion by the rods 72. In this manner, it will be seen that the beets are positively pulled or removed from the ground so that they may be quickly gathered, and as there is a continuous action of the revolving cones upon the continuous soil cushion formed between the furrows on opposite sides of the plant row, all possibility of any of the beets remaining in the ground is obviated. The plows and the revolving cones may be very easily adjusted vertically so that the plows will enter the ground to the desired depth, and the cones can also be shifted transversely by the adjustment of the hangers 28 and 36 to properly space the same so that they will exert the necessary upward compressing force upon the soil cushion in order to uproot the beets.

By means of my improved harvester, it will be seen that a large field of beets or similar vegetables may be quickly harvested with a minimum of manual labor. The plows and revolving cones, can be readily raised to inoperative positions and the clutches 65 shifted to stop the rotation of the cones 34 in leaving the field. The machine as a whole is of comparatively simple construction, not liable to get out of order, and is highly serviceable and efficient for the purpose in view. I have herein referred to the invention as primarily designed for the purpose of harvesting beets, but it is, of course, apparent that the invention may also be serviceably employed for the harvesting of analogous vegetable products. It is further to be understood that while I have disclosed the preferred form, construction and arrangement of the several elements employed, the machine is susceptible of considerable modification in such respects and I, therefore, reserve the privilege of adopting all such legitimate changes as may be fairly embodied within the spirit and scope of the invention as claimed.

Having thus fully described my invention, what I desire to claim and secure by Letters Patent is:—

1. In a beet harvesting machine, spaced hanger bearings, longitudinally disposed beet pulling members each having a shaft journaled in one of said bearings and supporting said members at their rear ends, means pivotally supporting said members at their forward ends, and means for transversely adjusting the hanger bearings to move the rear ends of said members toward or from each other and maintain the rotative axes of said members at a predetermined angle with respect to each other.

2. In a beet harvesting machine, spaced pairs of vertically movable hangers, beet pulling means operatively mounted in said hangers, mechanism for operating said beet pulling means in the travel of the machine, and manually operable means connected to the hangers to vertically move the same and raise or lower the beet pulling means.

3. In a beet harvesting machine, spaced pairs of vertically movable hangers, harvesting rollers operatively mounted in the corresponding hangers to travel upon opposite sides of the beet row, means for rotating said rollers in the travel of the machine, means for transversely adjusting the hangers in each pair with respect to each other, and manually operable means connected to the hangers to move the same vertically and raise or lower the harvesting rollers.

4. In a beet harvesting machine, spaced vertically movable frames, a pair of hangers mounted in each frame and adjustable toward or from each other transversely of the machine, harvesting rollers rotatably mounted upon the corresponding hangers to travel upon opposite sides of the beet row, furrow opening plows mounted upon the forward hangers, mechanism operatively connected to the rollers to rotate the same in the travel of the machine, and manually operable means connected to said frames to move the same vertically and raise or lower the plows and the harvesting rollers.

In testimony whereof I hereunto affix my signature in the presence of two witnesses.

JOHN COURTNEY.

Witnesses:
 GLADYS M. GILBERT,
 W. L. MARKS.